July 8, 1969 W. F. MILLER 3,454,882

RADIO RECEIVER USING PLURAL VARIABLE GAIN STAGES

Filed Feb. 25, 1966

INVENTOR.
WAYNE F. MILLER
BY Samuel Lindenberg
Arthur Frelich
ATTORNEYS

United States Patent Office 3,454,882

Patented July 8, 1969

3,454,882

RADIO RECEIVER USING PLURAL VARIABLE GAIN STAGES

Wayne F. Miller, Arcadia, Calif., assignor to California Institute Research Foundation, Pasadena, Calif., a corporation of California Filed Feb. 25, 1966, Ser. No. 530,002

Int. Cl. H04b *1/16;* H03g *3/30*

U.S. Cl. 325—405 10 Claims

ABSTRACT OF THE DISCLOSURE

A radio receiver in which the radio and intermediate frequency amplifiers and the mixer comprise a variable gain complementary transistor amplifier whose gain is established by the bias to it and which has a substantially constant bandwidth because of its large input and output impedances. The radio receiver also includes an output section following the intermediate frequency amplifier and an automatic gain control circuit that couples a given control signal from the output section to bias the radio and intermediate frequency amplifiers and the mixer to maintain the output level of the receiver substantially constant with fluctuations of the input signal.

This invention relates to improvements in radio receivers.

Many applications exist for relatively narrow band radio recievers capable of operating at very low power levels. For example, such receivers are useful in seismological mobile vans for receiving timing signals transmitted by a central station. In this application, it is essential that the timing of all the vans be synchronized so that when any seismological disturbance is detected by one of the vans, it can be related in time to disturbances detected by the other vans. Because the vans at various times may be located in disadvantageous areas relative to the central station, it is important that the radio receivers operate satisfactorily over a wide range of signal strengths. It is also important for the receivers to define a constant narrow bandwidth in order to provide a satisfactory signal-to-noise ratio. Further, it is of extreme importance that the power consumption of the receivers be minimized.

Standard broadcast receivers usually use single transistor amplifiers whose gain can be controlled by an automatic gain control circuit by varying the transistor bias point, i.e. the DC potential applied to the transistor base. Varying the transistor bias point in this manner changes the input and output impedance of the circuit thereby also changing the circuit bandwidth where the amplifier is connected in a tuned configuration. Although this bandwidth variation can be tolerated in most standard broadcast receiver applications, it cannot usually be tolerated where a narrow bandwidth and a low signal-to-noise ratio are desired for receiving digital timing signals.

In view of the foregoing, it is an object of the present invention to provide an improved radio receiver capable of responding to widely varying input signal strengths to provide a substantially constant amplitude output without any significant variation in bandwidth. It is a further object of this invention to provide such a radio receiver which operates at extremely low power levels.

Briefly, in accordance with the present invention, a radio receiver is provided including a radio frequency (RF) section, a mixer section and at least one intermediate frequency (IF) section. Each section is comprised of a similar variable gain amplifier circuit. An output circuit is provided following the IF stages and an automatic gain control (AGC) circuit is connected to respond to the output circuit for coupling a gain control signal back to the RF, mixer, and IF sections for maintaining the output level of the receiver substantially constant regardless of the signal strength fluctuations appearing at the receiver input.

In accordance with a significant aspect of the present invention, an amplifier circuit is provided whose gain can be varied very significantly (e.g. 30:1) without any significant corresponding variation in bandwidth. Variation in gain in accordance with the present invention is effected by varying a transistor bias point. The variation in bias point also changes the input and output impedances and accordingly where the amplifier is used as a tuned circuit with a specific bandwidth, the bandwidth is also changed. However, in accordance with the present invention, the input and output impedances of the transistors are extremely high as a result of operation at low current levels and thus any impedance variation resulting from bias point variation, has only a negligible effect on bandwidth. Operation at these low current levels inherently assures a low noise level.

More particularly, the current gain versus emitter current characteristic for substantially any transistor is described by a curve having a steep positive slope at very low emitter current levels and a steep negative slope at high emitter current levels with a substantially constant amplitude (zero slope) at intermediate emitter current levels. Whereas known prior art variable gain amplifiers operate on the negative slope portion of this characteristic curve, in accordance with the present invention high impedance components are selected to assure operation at very low current levels, i.e. on the positive slope portion of the curve.

In accordance with a still further aspect of the present invention, an improved automatic gain control (AGC) circuit is provided which is characterized by a sharper more accurate response than prior art circuit arrangements.

The novel features that are considered characteristics of this invention are set forth with particularity in the appended claims. The invention itself will best be understood from the following description when read in connection with the accompanying drawings, in which:

FIGURE 1(*a*) is a circuit diagram of a variable gain amplifier in accordance with the present invention;

FIGURE 1(*b*) illustrates a characteristic transistor curve; and

Figures 1A, 1B, 2:
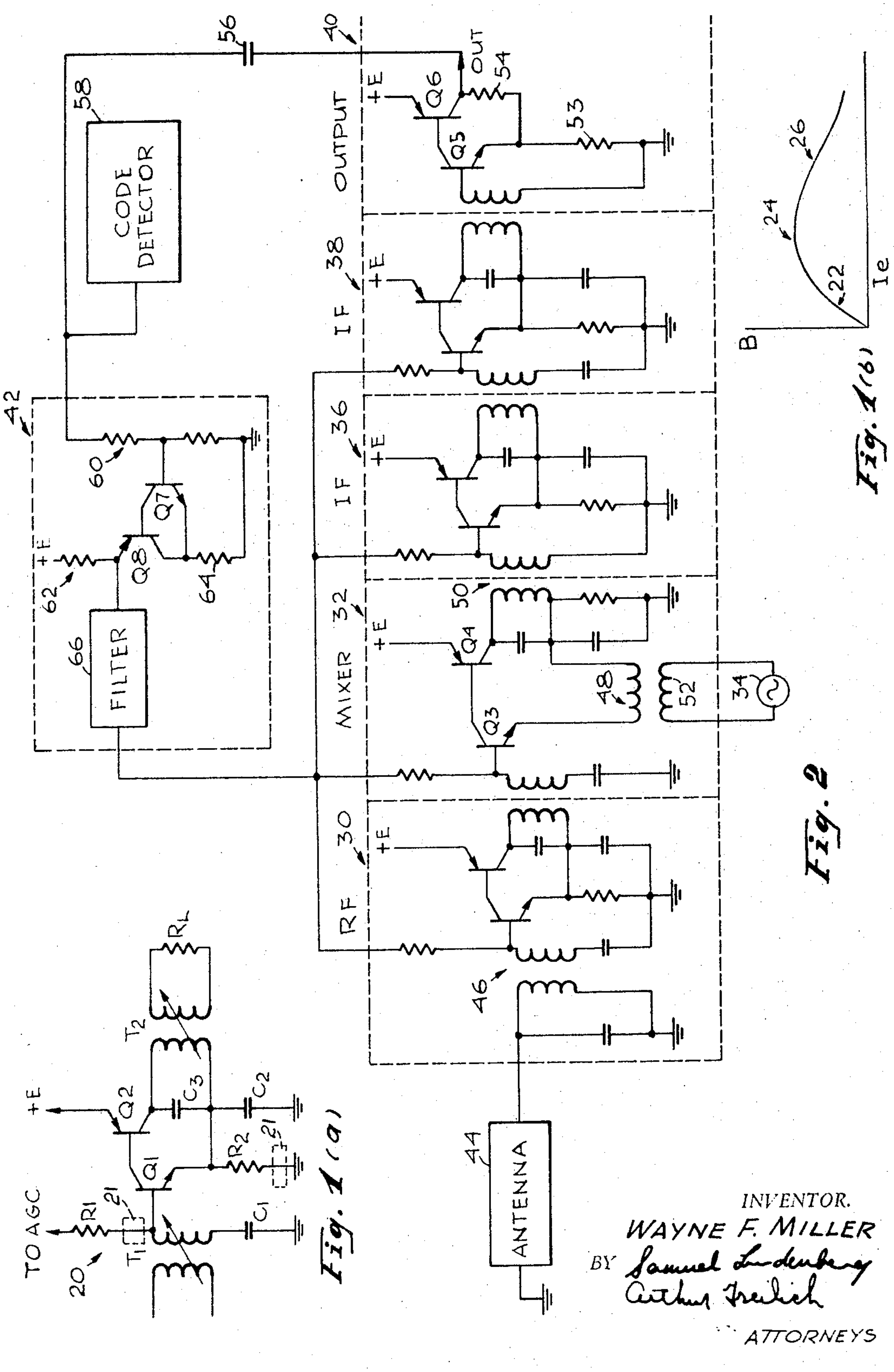
FIGURE 2 is a schematic diagram illustrating a preferred embodiment of a radio receiver constructed in accordance with the present invention.

Attention is now called to FIGURE 1(*a*) of the drawings which illustrate a variable gain amplifier constructed in accordance with the present invention. More particularly, the amplifier includes complementary transistors Q1 and Q2. Transistor Q1 is illustrated as being of the NPN type while transistor Q2 is illustrated as being of the PNP type. However, the invention is not restricted to the particular configuration illustrated and alternatively, both of the transistors can be of opposite type.

A series circuit 20 is connected between a positive potential source (e.g. an AGC circuit) and a reference potential, for example ground. The circuit branch 20 serves to establish the direct current bias on the base of transistor Q1 and additionally to apply the input signal thereto. The circuit branch 20 includes resistor R1 connected in series with the secondary winding of a transformer T1 and an alternating current by-pass capacitor C1. The emitter of transistor Q1 is connected through resistor R2 to a source of ground potential. Capacitor C2 is connected in parallel with resistor R2 as an alternating current by-pass.

The collector of transistor Q1 is connected to the base of transistor Q2 to thereby control the emitter current therethrough. The emitter of transistor Q2 is connected to a source of positive potential, e.g. +9 volts. The collector of transistor Q2 is connected through the primary winding of a transformer T2 to the resistor R2 and capacitor C2. A tuning capacitor C3 is connected across the primary winding of the transformer T2. The input signal to the amplifier is inductively coupled to the secondary winding of transformer T1 from the primary winding thereof. The output signal developed across the primary winding of transformer T2 is coupled to the secondary winding thereof to a load $R_L$.

FIGURE 1(*b*) illustrates the current gain versus emitter current characteristic of a typical transistor. It can be noted that the characteristic curve is comprised of a low emitter current region 22 in which the slope is positive meaning that the current gain is directly related to the emitter current amplitude, a center region 24 in which the characteristic curve has a substantially zero slope, and a high emitter current region 26 in which the slope of the characteristic curve is negative. In accordance with the present invention, the bias point of transistor Q1, established by resistors R1 and R2, is selected to lie somewhere in the region 22, for example with an emitter current of one microamp. Although the bias point of transistor Q1 is established by resistors R1 and R2, it is stabilized by the direct current feedback from transistor Q2 to transistor Q1. For small emitter currents, the following equation is highly accurate:

$$h_{ib}=KT/qI_e \qquad (1)$$

where K=Boltman's constant, T=° K., $q$=charge on an electron, $I_e$=transistor emitter current, and $h_{ib}$=the input impedance of a transistor connected in a common base configuration with its output shorted.

The overall voltage gain of the amplifier can be expressed as:

$$K_v \approx \alpha_1 \beta_2 \frac{R_i}{h_{ie1}} \qquad (2)$$

where $\beta_2=\beta$ of Q2, $\alpha_1=\alpha$ of Q1, $h_{ie1}$=input impedance of Q1 and $R_i$=reflected load. Inasmuch as $h_{ie}$ equals $(\beta+1)h_{ib}$, it should be apparent from Equations 1 and 2 that for small emitter currents, the overall voltage gain of the amplifier of FIGURE 1(*a*) is directly related to the amplitude of the transistor emitter current as is illustrated by the characteristic curve of FIGURE 1(*b*). Accordingly, by adjusting the potential applied to the upper terminal of resistor R1, the overall gain of the amplifier can be significantly varied thus permitting the amplifier to function satisfactorily over a wide signal strength range, e.g. 30 db. As previously noted, such gain variation normally varies the circuit bandwidth significantly. However, inasmuch as the input and output impedances of the circuit of FIGURE 1(*a*) are high in accordance with the invention as a result of operating in region 22 of FIGURE 1(*b*), the change in impedance is negligible for most applications. In addition, the circuit of FIGURE 1(*a*) requires very little power inasmuch as the emitter current of transistor Q1 should be held low, i.e. on the order of one microampere.

In the operation of the circuit of FIGURE 1(*a*), assume initially that no alternating current signal is being applied to the primary of transformer T1. The base of transistor Q1 will be held at a level established by resistors R1 and R2 to slightly forward bias transistor Q1 thereby drawing base current from transistor Q2. The collector current from transistor Q2 flowing through the primary winding of transformer T2 to the resistor R2 will provide direct current stabilization. When an alternating current signal is coupled to the secondary winding of transformer T1, it will of course modulate the emitter current through transistor Q1 which effect will of course be amplified by transistor Q2 and applied to the primary winding of transformer T2. The by-pass capacitor C2 effectively removes resistor R2 so far as alternating current considerations are concerned and assures a high AC gain for the amplifier.

Due to the extremely high impedance of the resistors R1 and R2 required to assure adequately low current levels, a low impedance meter 21 (shown dotted) can be connected in series with the resistors to monitor the current without affecting the normal circuit operation.

Attention is now called to FIGURE 2 which illustrates the manner in which the amplifier of FIGURE 1(*a*) can be utilized in a radio receiver in order to provide a narrow band low power radio receiver capable of satisfactorily operating over a wide range of input signal strengths. More particularly, the radio receiver in FIGURE 2 is comprised of a radio frequency (RF) section 30, a mixer section 32 fed by a local oscillator 34, one or two intermediate frequency (IF) sections 36 and 38, an output section 40, and an automatic gain control circuit 42 coupled back to the RF, mixer, and IF sections.

The RF section 30 is fed by an antenna 44 coupled to the primary winding of transformer 46. It should be apparent that the secondary winding of transformer 46 is connected in the same amplifier arrangement as is shown in FIGURE 1(*a*). The output of the amplifier of the RF section 30 is coupled to the input of an ampliler in the mixer section 32. In the mixer section 32, a transformer secondary winding 48 is connected in series with a primary winding 50 between the emitter of transistor Q3 and the collector of transistor Q4. The local oscillator 34 feeds primary winding 52 which is inductively coupled to winding 48.

The primary winding 50 feeds the IF stage 36 which is identical to the amplifier illustrated in FIGURE 1(*a*). The output of section 36 feeds section 38 which in turn is coupled to an output circuit 40. It is to be noted that the bias points established in the RF, mixer, and IF sections are controlled by the output of the AGC circuit 42. The output circuit 40 is comprised of a substantially similar complementary transistor amplifier including transistors Q5 and Q6. The emitter of transistor Q5 is connected through a resistor 53 to ground while the collector thereof is connected to the base of transistor Q6. The collector of transistor Q6 is connected through resistor 54 to the emitter of transistor Q5. The emitter of transistor Q6 is connected to a positive potential source. The output from the output circuit 40 is taken from the collector of transistor Q6 and is coupled via capacitor 56 to the automatic gain control circuit 42 and a code detector 58.

The output signal from circuit 40 comprises an alternating signal at the intermediate frequency (IF) having an average value of zero and contains the code or timing information previously mentioned. The code detector 58 derives the timing information from the circuit 40 output signal.

The AGC circuit 42 contains a voltage divider 60 having a tap connected to the base of NPN transistor Q7. The collector and emitter of transistor Q7 are respectively connected to the base and collector of PNP transistor Q8. The emitter of transistor Q8 is connected through resistor 62 to a source of positive potential and its collector is connected through resistor 64 to a source of ground potential. The alternating signal provided to the base of transistor Q7 will cause both transistors Q7 and Q8 to operate in a very nonlinear fashion. The signal obtained from transistor Q8 will still be an alternating signal but due to the nonlinear operation of transistors Q7 and Q8, the average value of this signal will be inversely proportional to the amplitude of the signal from circuit 40.

The filter, 66, connected to the emitter of transistor Q8 removes the alternating current component from the output signal therefrom and produces a direct current potential having a magnitude which is inversely proportional to the amplitude of the intermediate frequency signal obtained from circuit 40.

In the operation of the radio receiver of FIGURE 2, as the signal strength provided by the antenna 44 increases, the output signal available from the collector of transistor Q6 in section 40 also tends to increase. Consequently, this lowers the magnitude of the signal provided by transistor Q7. As a consequence, a lowered potential is applied through filter 66 to the series circuits of the sections 30, 32, 36, and 38, thereby lowering their bias points and decreasing the overall gain of the receiver. As previously noted, since each of the sections has a very high input and output impedance due to the fact that low emitter currents, on the order of microamperes, are employed the change in gain will only negligibly affect the impedance and therefore will not critically affect the bandwidth. By maintaining the emitter currents at a low level, the power consumption of the radio receiver is relatively very low.

From the foregoing, it should be appreciated that an extremely useful radio receiver has been disclosed herein which is able to operate over a significant range of input signal strengths at low power levels while maintaining a constant narrow bandwidth. By maintaining this bandwidth, the circuit will inherently have good signal-to-noise characteristics. It should be appreciated that the advantages of the radio receiver of FIGURE 2 over the state of the art are in a large measure attributable to the particular amplifier configuration shown in FIGURE 1(*a*).

What is claimed is:

1. A variable gain circuit for amplifying input signals of frequency $f_1$ said circuit comprising:
- first and second complementary transistors each having a base, an emitter, and a collector;
- a first source of DC bias potential connected to said second transistor emitter;
- a resistance path connecting said first transistor emitter to a second source of DC bias potential;
- impedance means connecting said second transistor collector to said first transistor emitter, said impedence means defining a relatively high impedance to signals of frequency $f_1$ and a relatively low impedance to DC bias signals;
- means connecting said first transistor collector to said second transistor base;
- means connected to said first transistor base for biasing said first transistor for operation in a low emitter current region in which current gain is directly related to emitter current magnitude; and
- an alternating current by-pass capacitor connected in parallel with said resistance path.

2. The apparatus of claim 1 wherein said means for biasing said first transistor includes a series circuit comprised of a resistor and a transformer secondary winding connected between third and fourth sources of direct current reference potential;
- means connecting said first transistor base to said series circuit; and
- means for supplying alternating current energy to said secondary winding.

3. The apparatus of claim 2 including a second alternating current by-pass capacitor connected in said series circuit.

4. The apparatus of claim 1 wherein said impedance means comprises a transformer primary winding.

5. The apparatus of claim 4 including means for tuning said transformer primary winding.

6. A radio receiver comprising:
- a radio frequency amplification section;

- antenna means for supplying a radio frequency signal to said radio frequency section;
- a local oscillator;
- a mixer section responsive to said local oscillator and said radio frequency section for developing an intermediate frequency signal;
- an intermediate frequency amplification section responsive to said intermediate frequency signal;
- an output circuit coupled to said intermediate frequency amplification section;
- each of said sections including first and second complementary transistors including a base, an emitter, and a collector;
- bias means for biasing each of said first transistors for operation in a low emitter current region in which current gain is directly related to emitter current magnitude; and
- automatic gain control means, responsive to said output circuit, and providing a feedback signal to each of said bias means.

7. The radio receiver of claim 6 wherein each of said bias means includes a series circuit comprised of a resistor and a first transformer secondary winding connected in series between said automatic gain control means and a source of reference potential; and
- means connecting each of said first transistor bases to the series circuit associated therewith.

8. The radio receiver of claim 7 including a transformer primary winding connected between each second transistor collector and the emitter of the associated first transistor.

9. The radio receiver of claim 7 wherein said mixer section includes a second transformer secondary winding connected in series between said first transistor emitter and said second transistor collector; and
- means coupling said radio frequency amplification section and said local oscillator to said first and second transformer secondary windings respectively.

10. The radio receiver of claim 6 wherein said automatic gain control means includes third and fourth complementary transistors each having a base, an emitter, and a collector;
- a voltage divider connected between said output circuit and a source of reference potential;
- means connecting said third transistor base to said voltage divider; and
- means connecting said third transistor collector to said fourth transistor base.

References Cited

UNITED STATES PATENTS

| | | | |
|---|---|---|---|
| 3,271,691 | 9/1966 | Hendon et al. | 330—17 |
| 2,898,454 | 8/1959 | Loughlin | 325—485 |
| 2,895,045 | 7/1959 | Kagan | 330—17 |
| 2,885,544 | 5/1959 | Radcliffe | 325—411 |

OTHER REFERENCES

Shea, Richard F.: Amplifier Handbook, McGraw-Hill Book Company, 1966, ch. 18, p. 25, and ch. 23, p. 9.

Roddam, Thomas: Transistor Amplifiers for Audio Frequencies, Iliffe Books Ltd., London, 1964, p. 166.

KATHLEEN H. CLAFFY, *Primary Examiner.*

C. JIRAUCH, *Assistant Examiner.*

U.S. Cl. X.R.

325—410, 411; 330—17, 25